2,963,455
RESINOUS COMPOSITIONS CONTAINING EPOXIDIZED VEGETABLE OILS

Stanley P. Rowland, Cincinnati, Ohio, and Richard F. Conyne, Andalusia, Pa., assignors to Rohm & Haas Company, Philadelphia, Pa., a corporation of Delaware No Drawing. Original application July 15, 1953, Ser. No. 368,236, now Patent No. 2,822,368. Divided and this application Jan. 27, 1958, Ser. No. 711,159

18 Claims. (Cl. 260—23)

This invention relates to resinous compositions containing epoxidized vegetable oils and to their preparation and use.

The instant application is a division of our United States patent application Serial No. 368,236, filed on July 15, 1953, now Patent No. 2,822,368.

An object of this invention is to provide epoxidized oils which have superior properties when employed as plasticizers for such plastic materials as vinyl resins, nitrocellulose, and chlorinated rubber.

Another object is to prepare epoxidized oils which are not only extremely compatible with a wide range of plastics but which give rise to very stable compositions.

These and other objects are achieved by hydrogenating an epoxidized vegetable oil until the degree of residual unsaturation of the oil is reduced to the point where it is equal to—or preferably less than—that represented by an iodine number of three.

Currently large quantities of plastic articles are made from plasticized compositions containing polyvinyl chloride, polyvinyl acetate, copolymers of vinyl chloride and vinyl acetate, polyvinylidene chloride, polyvinyl butyral, nitrocellulose and chlorinated rubber. It is common practice to use epoxidized oils as plasticizers in the preparation of such plastic materials as is evident from sales literature and U.S. Patents 2,556,145 and 2,559,177. The epoxidized oils in turn are made by treating vegetable oils with peracids, typified by performic and peracetic acids, as shown, for example, in U.S. Patents 2,458,484, 2,485,160, and 2,569,502. While such plasticized compositions have generally good properties, they do, nevertheless, suffer from at least one deficiency which limits their use; namely, that they often become tacky and subsequently dirty when they are exposed to light and heat. For instance, when such compositions are merely placed near a window for a period of weeks, they become sticky and at the same time they retain dust which falls upon them. Frequently they also become stiffer. These objectionable properties are believed to result from a gradual spewing or migration of a part of the plasticizer to the surface of the composition.

An object, therefore, of this invention is to provide improved epoxidized oils which have little, if any, tendency to behave in this way so that more stable plastic compositions can be made for use in such articles as curtains, draperies, upholstery, luggage, handbags, and the like.

It has now been found that epoxidized oils which have a relatively high content of oxirane oxygen, or epoxy oxygen, together with a very low degree of residual unsaturation are far superior as plasticizers to the epoxidized oils prepared heretofore, all of which had definitely more residual unsaturation. The combination of high content of oxirane oxygen and almost complete saturation is responsible for the enhanced compatibility-stability characteristics of the products of this invention. These improved oils are made by hydrogenating an epoxidized oil which has an oxirane oxygen-content of at least 4.5% and preferably one above 5.5%, whereby the double bonds in the oil become saturated at least to the point where the iodine number of the oil is reduced to a maximum value of three and preferably to a value of about one. During hydrogenation there is a tendency for the epoxy groups already present in the oil to change to hydroxyl groups. And while some of this conversion can be tolerated, it is important to keep it at a minimum because, although the stability of the plastic composition on aging is dependent upon the reduction of the unsaturation of the oil, the original compatibility of the epoxidized oil is directly proportional to its oxirane-oxygen content.

The epoxidized oils which are hydrogenated by the process of this invention are themselves prepared by the methods described in the patents listed above. It is essential that the oils contain at least 4.5% oxirane oxygen before hydrogenation and actually it is preferred that they contain at least 5.5%. During hydrogenation, the oxirane-oxygen content is usually reduced about 0.3 to 0.4%. That is, an oil containing 5.7% oxirane oxygen before hydrogenation contains about 5.4% oxirane oxygen after hydrogenation. Therefore, in order to end with an oil having a minimum oxirane-oxygen content of 5.0 it is best to start with an oil having an oxirane-oxygen content of about 5.3–5.5%.

The efficiency of the hydrogenation process depends upon several interrelated factors which can be varied over reasonably wide limits.

Excellent results have been obtained with Raney nickel, finely divided platinum and finely divided palladium as catalysts. The latter two catalysts are more effective at low temperatures and in lower concentrations than the Raney nickel. Thus, very rapid hydrogenation of the double bonds in epoxidized oils takes place, in the presence of only a fraction of one percent noble metal based on the oil, at room or ambient temperatures. With the use of these catalysts the temperatures may even be lowered to about 0° C. if desired. In the case of Raney nickel, it is preferred to use higher temperatures; namely, those from about 50° C. to about 100° C. In fact, with Raney nickel the rate of hydrogenation is unnecessarily sluggish below about 70° C.

As higher temperatures are employed, there is an increasingly greater tendency for the epoxy groups to be degraded or to be reduced to hydroxyl groups and accordingly the lowest temperatures, consistent with reasonable speed of saturation of the double bonds, are recommended. Temperatures up to 150° C. have been employed with Raney nickel as a catalyst, but those below 100° C. are preferred and those above 150° C. are best avoided.

As little as 0.1% palladium or platinum catalyst based on the oil is effective. Higher amounts of Raney nickel, starting at about 1% and going as high as about 20%, are recommended.

Ordinarily solvents for the oils are employed and these also exert some influence on the rate of hydrogenation. Hydrocarbons such as heptane and iso-octane, which are readily removed from the product, are suitable. Lower alcohols are likewise recommended, particularly since they permit the use of smaller amounts of catalysts.

The pressure of hydrogen also influences the rate of hydrogenation and while pressures of less than one atmosphere have been employed with palladium or platinum as the catalyst, higher pressures—ordinarily of ten or more atmospheres—are recommended when Raney nickel is used. The uppermost pressure in any case is limited only by the convenience and safety of operation.

Rocking hydrogenation bombs, autoclaves, Paar shakers, and gas dispersion units have been used, The following epoxidized oils containing at least 4.5% oxirane oxygen have been converted by hydrogenation to essentially saturated products having oxirane-oxygen contents of at least 4.0%: epoxidized soybean, corn, cottonseed, safflower, sunflower, sesame, poppyseed, walnut and peanut oils.

The following examples serve to illustrate the preparation and use of the epoxidized oils of this invention:

EXAMPLE 1

Several portions of an epoxidized soybean oil, prepared by the process of U.S. Patent 2,485,160, using performic acid and containing 5.81% oxirane oxygen and having an iodine number of 20, were hydrogenated in a stainless steel rocking bomb. To the oil was added 10% Raney nickel and the hydrogen pressure was maintained at 1000–1200 pounds per square inch (p.s.i.). After the reaction was complete, the bomb and contents were allowed to cool slowly to room temperature. The following is a tabulation of the reactants, conditions of operation, and the physical properties of the products obtained.

Table I

| | Run 1 | Run 2 | Run 3 | Run 4 |
|---|---|---|---|---|
| Reaction: | | | | |
| Epoxidized Oil _____ parts__ | 400 | 400 | 400 | 400 |
| Heptane _____ do____ | 200 | 200 | 200 | 200 |
| Raney Nickel (on oil) ___ percent__ | 10 | 10 | 10 | 10 |
| Hydrogen (pressure in p.s.i.)_____ | 1,170 | 1,140 | 1,090 | 1,170 |
| Temperature _____°C__ | 78–95 | 80–110 | 79–85 | 60–78 |
| Time (in Hours) _____ | 4.75 | 4 | 5 | 4 |
| Product: | | | | |
| Oxirane Oxygen _____ percent__ | 5.55 | 5.19 | 5.03 | 5.5 |
| Iodine Number _____ | 1 | 2 | 1 | 1.6 |

Thermoplastic compositions were prepared in the form of sheets by fluxing and milling at 325° F. the following materials: 60 parts of polyvinyl chloride (Geon 101); 40 parts of an epoxidized oil plasticizer; 1 part of tribasic lead sulfate as a stabilizer; and 0.5 part of stearic acid as a mold lubricant. Samples of the individual hydrogenated oils prepared above were compared, in the role of the oil plasticizer, with the original epoxidized oil which had not been hydrogenated. The composition containing the non-hydrogenated oil served as control. Specimens of all of the compositions were tested side by side in a Fade-O-Meter at a temperature of 110° C. Other specimens of the compositions were exposed to ordinary daylight by being placed side by side on the interior sill of a window at room temperature. In the Fade-O-Meter test, the control composition containing the non-hydrogenated oil became excessively tacky in 45 hours, showed a definite spewing in 106 hours, and stiffened badly and cracked in 289 hours, whereas the compositions containing the hydrogenated oils showed only the slightest spewing in 312 hours and did not crack until 757 hours had passed. The control sample on window exposure developed a definite tackiness in 15 days, showed definite spewing in 35 days, definite stiffening in 87 days, and after 270 days was extremely stiff and dirty. Under the same conditions, the compositions containing the hydrogenated oils gave no evidence of spewing or stiffening in at least 270 days. They had clean surfaces and were considered to be essentially unchanged.

EXAMPLE 2

In Table II are listed the reactants, conditions of reaction and the analyses of the products obtained by hydrogenating, under a variety of conditions, an epoxidized soybean oil made according to the process of U.S. Patent 2,485,160 with performic acid and having an oxirane-oxygen content of 5.8% and an iodine number of 17. The pressures of hydrogen are expressed in pounds per square inch (p.s.i.) and the percentages of catalyst and solvent are based on the weight of the oil being hydrogenated.

Table II

| Run No. | Apparatus | Temp., °C. | Hydrogen Pressure | Time in Hours | Percent Raney Ni. | Percent Solv. | Percent Oxirane Oxygen | Iodine Number |
|---|---|---|---|---|---|---|---|---|
| 5 | Paar Shaker | 70–80 | 30 | 1.75 | 17 | 50 percent Isooctane. | 5.50 | 2.4 |
| 6 | Rocking Bomb | 84–87 | 295 | 1.0 | 17 | _____do_____ | 5.47 | 1.3 |
| 7 | Gas Diffuser | 50 | 15 | 4.0 | 17 | _____do_____ | 5.56 | 3.0 |
| 8 | _____do_____ | 75 | 15 | 2.0 | 17 | _____do_____ | 5.18 | 2.6 |
| 9 | _____do_____ | 75 | 15 | 2.0 | 17 | _____do_____ | 5.37 | 2.0 |
| 10 | Rocking Bomb | 70–80 | 190 | 2.0 | 2 | 50% Ethanol | 5.7 | 2.2 |
| 11 | _____do_____ | 70–80 | 45 | 4.5 | 17 | 50% Isooctane | 5.0 | 1.0 |
| 12 | _____do_____ | 70–80 | 1,790 | 1.0 | 17 | _____do_____ | 5.3 | 0.1 |
| 13 | _____do_____ | 75–80 | 190 | 2.5 | 5 | _____do_____ | 5.5 | 1.0 |
| 14 | _____do_____ | 75–80 | 90 | 2.75 | 5 | _____do_____ | 5.7 | 2.3 |
| 15 | _____do_____ | 70–80 | 90 | 2.5 | 2 | 50% Ethanol | 5.6 | 2.1 |
| 16 | _____do_____ | 70–80 | 15 | 4.0 | 2 | _____do_____ | 5.5 | 2.8 |

EXAMPLE 3

An epoxidized soybean oil was prepared by the procedure described in Example 4 of U.S. Patent 2,485,484. In this process, 292 parts of peracetic acid solution (prepared from glacial acetic acid and 30% $H_2O_2$) was treated with 18.3 parts of sodium acetate trihydrate. Then 50 parts of soybean oil was added and the reaction mixture was vigorously agitated for 3½ hours at 35° C. The isolated oil had an oxirane-oxygen content of 5.4%, an iodine number of 16, and a viscosity of 2.4 poises. This oil dissolved in its own weight of isooctane was then hydrogenated in a rocking bomb at 75–80° for two hours with hydrogen at a pressure of 190 p.s.i. in the presence of 17% Raney nickel. The resultant product, freed of solvent, had an oxirane-oxygen content of 5.2%, an iodine number of 1.1, and a viscosity of 2.6 poises.

EXAMPLE 4

Safflowerseed oil was epoxidized by the process of U.S. Patent 2,569,502 by reacting safflowerseed oil with peracetic acid at 20° C. The product had an iodine number of 16, a viscosity of 2.25 poises, and contained 6.0% oxirane oxygen.

The oil was next hydrogenated under the same conditions as described in Example 3, immediately above, and the resultant product had an iodine number of 1.0, a viscosity of 3.2 poises, and contained 5.74 oxirane oxygen.

EXAMPLE 5

A sample of linseed oil was epoxidized by the process of U.S. Patent 2,485,160 using one mole of $H_2O_2$ for each double bond in each mole of the oil. The product which had an oxirane-oxygen content of 7.4%, an iodine number of 28 and a viscosity of 4 poises was then hydrogenated under conditions identical with those described in Example 3 above. The final isolated oil then had an oxirane-oxygen content of 7.1%, an iodine number of 2 and a viscosity of 4 poises.

EXAMPLE 6

Soybean oil was epoxidized by the process of U.S. Patent 2,485,160 using formic acid and $H_2O_2$. The latter reagent was employed in a ratio of only 0.7 mole per double bond in each mole of oil with the result that a product was obtained which contained only 4.6% oxirane oxygen and which had an iodine number of 40. This expoxidized oil was then hydrogenated by the process of Example 3 above and gave rise to a product which contained 4.31% oxirane oxygen and had an iodine number of 2.7. The advantage of the hydrogenated oil over the original oil in its compatibility-stability characteristics when incorporated into polyvinyl chloride was striking.

EXAMPLE 7

An epoxidized cottonseed oil was prepared by the following process which has been recommended as a commercially feasible method. (Bulletin #16 entitled "Epoxidation and Hydroxylation with Hydrogen Peroxide and Peracetic Acid," published July 12, 1950, December 19, 1950, and March 1952 by Buffalo Electro-Chemical Company, Inc., Buffalo, New York): A solution of 30 grams of anhydrous sodium acetate and 498 grams of 40% peracetic acid was added slowly to 550 grams of cottonseed oil while the latter was vigorously agitated. One-third of the peracetic acid solution was added over a period of 30 minutes while the temperature was maintained at 15°–20° C. and the remainder was added over the next 30 minutes while the temperature was held at 20°–25° C. The reaction mixture was stirred at 25° C. for four hours, after which it was poured into 500 ml. of a saturated NaCl solution. The oil layer was separated and washed repeatedly with saturated salt solution until it was free of acid. It was then dried with anhydrous sodium sulfate and filtered. The product had an oxirane-oxygen content of 5.1% and an iodine number of 12.

This oil was next hydrogenated by the process described in Example 3 above and the final product had an iodine number of 1.3 and contained 4.76% oxirane oxygen.

EXAMPLE 8

A modification of the method described in Example 7 was followed in preparing epoxidized linseed oil. A total of 294.8 grams of 40% peracetic acid in acetic acid containing 10 grams of anhydrous sodium acetate was added over a period of 45 minutes to 270 grams of linseed oil held at 20°–23° C. In this case the ratio of peracetic acid to linseed oil was equivalent to about 0.78 mole for every double bond in each mole of oil. The mixture was stirred at 20° C. for one hour after which the oil was shaken with 277 grams of ice-water. After removal of the aqueous phase, the oil was diluted with 200 grams of toluene and the solution was washed three times with 200 ml. portions of a saturated aqueous solution of sodium sulfate. The oil was then separated and next stripped of toluene and water at 100° C./25 mm. The filtered product had an oxirane-oxygen content of 6.3% and an iodine number of 51.

When this oil was hydrogenated by the process of Example 3 above, the final product had an iodine number of 2 and contained 6.06% oxirane oxygen.

EXAMPLE 9

A second sample of epoxidized linseed oil was prepared by the general process of Example 7 above, employing, however, a 41% excess of peracetic acid over that amount required by theory to convert all of the double bonds to epoxy groups. Thus, 536 grams of 40% peracetic acid containing 18 grams of sodium acetate was added over a period of 45 minutes to 270 grams of linseed oil and the mixture was then stirred for 2 hours at 26°–27° C. The oil, after being washed and filtered, contained 8.1% oxirane oxygen and had an iodine number of 6. This material was next hydrogenated by the process of Example 3 above with the result that an oil was obtained which had an iodine number of 2 and an oxirane-oxygen content of 7.6%.

The above examples serve to show how relatively unsaturated epoxidized oils which have been prepared by a variety of methods can be converted to essentially saturated epoxidized oils. It is to be further noted that in every instance the hydrogenated oil had much more satisfactory compatibility-stability characteristics than the epoxidized oil from which it was made. That is to say, in all cases the hydrogenated products were not only compatible with polyvinyl chloride like the less saturated epoxidized oils but they remained in uniform and homogeneous relationship with the polyvinyl chloride and did not migrate to the surface and spew and pick up dirt like the non-hydrogenated oils.

The following example illustrates the use of palladium and platinum as catalysts in the hydrogenation of epoxidized oils at low temperatures and under low pressures. The products prepared in this way have the same advantages of compatibility and stability which characterize the materials prepared with Raney nickel at higher temperatures and higher pressures.

EXAMPLE 10

A solution of 500 parts of the same epoxidized soybean oil employed in Example 2 above in 250 parts of iso-octane was placed in a Paar shaker, and to it was added 50 parts of a platinum-on-carbon catalyst containing 5% metallic platinum. Hydrogen was admitted under a pressure of 15 p.s.i. After 15 minutes the absorption of hydrogen appeared to be complete but the reaction was allowed to continue for 15 minutes more. The product, after being isolated from the catalyst and solvent, had an oxirane-oxygen content of 5.27% and an iodine number of 0.6.

The above procedure was followed with the one exception that a palladium-on-carbon catalyst, in the same amount and containing the same percentage of palladium, was substituted for the platinum catalyst. Results were essentially identical with those described above and the product had an oxirane-oxygen content of 5.4 and an iodine number of 0.6.

It is apparent from these results that the process of hydrogenation can be carried out batch-wise or by a continuous process.

We claim:

1. A composition of matter comprising a resin selected from the group consisting of (1) polyvinyl chloride, polyvinyl acetate, copolymers of vinyl chloride and vinyl acetate, polyvinylidene chloride, polyvinyl butyral, nitrocellulose and chlorinated rubber, and having incorporated therein a plasticizing amount of (2) an epoxidized triglyceryl vegetable oil having an oxirane-oxygen content of at least about 5.0% and a degree of unsaturation no greater than that represented by an iodine number of about one.

2. A composition of matter comprising about 60 parts of a resin selected from the group consisting of (1) polyvinyl chloride, polyvinyl acetate, copolymers of vinyl chloride and vinyl acetate, polyvinylidene chloride, polyvinyl butyral, nitrocellulose and chlorinated rubber, and having incorporated therein about 40 parts of (2) an epoxidized vegetable oil having an oxirane-oxygen content of at least about 5.0% and a degree of unsaturation no greater than that represented by an iodine number of about one.

3. A composition of matter comprising a resin selected from the group consisting of (1) polyvinyl chloride, polyvinyl acetate, copolymers of vinyl chloride and vinyl acetate, polyvinylidene chloride, polyvinyl butyral, nitrocellulose and chlorinated rubber, and having incorporated therein a plasticizing amount of (2) an epoxidized triglyceryl vegetable oil having an oxirane-oxygen content of at least about 5.0% and a degree of unsaturation as represented by an iodine number in the range of about one to about 0.1.

4. A composition of matter comprising a resin selected from the group consisting of (1) polyvinyl chloride, polyvinyl acetate, copolymers of vinyl chloride and vinyl acetate, polyvinylidene chloride, polyvinyl butyral, nitrocellulose and chlorinated rubber, and having incorporated therein a plasticizing amount of (2) an epoxidized triglyceryl vegetable oil having an oxirane-oxygen content of at least about 5.0% and a degree of unsaturation as represented by an iodine number in the range of about one to 0.6.

5. A composition of matter comprising a resin selected from the group consisting of (1) polyvinyl chloride, polyvinyl acetate, copolymers of vinyl chloride and vinyl acetate, polyvinylidene chloride, polyvinyl butyral, nitrocellulose and chlorinated rubber, and having incorporated therein a plasticizing amount of (2) an epoxidized triglyceryl vegetable oil having an oxirane-oxygen content of at least about 5.0% and a degree of unsaturation as represented by an iodine number in the range of about 0.6 to about 0.1.

6. A resinous composition of matter comprising a copolymer of vinyl chloride and a compound selected from the group consisting of vinyl acetate and vinylidene chloride and intimately incorporated therein a plasticizing amount of an epoxidized triglyceryl vegetable oil having an oxirane-oxygen content of at least about 5.0% and a degree of unsaturation as represented by an iodine number in the range of about one to about 0.1.

7. The resinous composition of matter of claim 6 in which the vegetable oil is soybean oil.

8. A resinous composition of matter comprising about 60 parts of a copolymer of vinyl chloride and a compound selected from the group consisting of vinyl acetate and vinylidene chloride and intimately incorporated therein about 40 parts of an epoxidized vegetable oil having an oxirane-oxygen content of at least about 5.0% and a degree of unsaturation as represented by an iodine number in the range of about one to about 0.1.

9. A resinous composition of matter comprising a copolymer of a vinyl chloride and a minor proportion of vinyl acetate and intimately incorporated therein a plasticizing amount of an epoxidized triglyceryl vegetable oil having an oxirane-oxygen content of at least about 5.0% and a degree of unsaturation as represented by an iodine number in the range of about one to about 0.1.

10. A resinous composition of matter comprising polyvinyl chloride and intimately incorporated therein a plasticizing amount of an epoxidized triglyceryl vegetable oil having an oxirane-oxygen content of at least about 5.0% and a degree of unsaturation no greater than that represented by an iodine number of about one.

11. The resinous composition of matter of claim 10 in which the vegetable oil is soybean oil.

12. The resinous composition of matter of claim 11 in which the soybean oil has an iodine number of about 0.6.

13. The resinous composition of matter of claim 11 in which the soybean oil has an iodine number of about 0.1.

14. The resinous composition of matter of claim 10 in which the vegetable oil is corn oil.

15. The resinous composition of matter of claim 10 in which the vegetable oil is linseed oil.

16. The resinous composition of matter of claim 10 in which the vegetable oil is safflowerseed oil.

17. The resinous composition of matter of claim 10 in which the vegetable oil is cottonseed oil.

18. A resinous composition of matter comprising about 60 parts of polyvinyl chloride and intimately incorporated therein about 40 parts of an epoxidized vegetable oil having an oxirane-oxygen content of at least about 5.0% and a degree of unsaturation no greater than that represented by an iodine number of about one.

References Cited in the file of this patent

UNITED STATES PATENTS

| | | |
|---|---|---|
| 2,485,160 | Niederhauser et al. | Oct. 18, 1949 |
| 2,556,145 | Niederhauser | June 5, 1951 |
| 2,569,502 | Swern et al. | Oct. 2, 1951 |
| 2,692,271 | Greenspan et al. | Oct. 19, 1954 |
| 2,857,349 | Greenspan et al. | Oct. 21, 1958 |

FOREIGN PATENTS

| | | |
|---|---|---|
| 757,407 | Great Britain | Sept. 19, 1956 |

OTHER REFERENCES

Witnauer et al.: Industrial and Engineering Chem., November 1955, vol. 47, No. 11, pages 2304–2311.